United States Patent
Ho (10) Patent No.: US 9,275,535 B1
(45) Date of Patent: Mar. 1, 2016

(54) DETECTING AND IDENTIFYING FARE EVASION AT AN ACCESS CONTROL POINT

(71) Applicant: Cubic Corporation, San Diego, CA (US)

(72) Inventor: Patrick Ho, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/822,411

(22) Filed: Aug. 10, 2015

Related U.S. Application Data (60) Provisional application No. 62/036,012, filed on Aug. 11, 2014.

(51) Int. Cl.
*G07C 9/00* (2006.01)
*G08B 21/18* (2006.01)
*G01S 5/02* (2010.01)
*G01S 5/00* (2006.01)
*G01C 9/00* (2006.01)

(52) U.S. Cl.
CPC *G08B 21/18* (2013.01); *G01C 9/00* (2013.01); *G01S 5/00* (2013.01); *G01S 5/02* (2013.01); *G01S 5/0294* (2013.01); *G07C 9/00007* (2013.01); *G07C 9/00111* (2013.01)

(58) Field of Classification Search
CPC .. G07C 9/00; G07C 9/00007; G07C 9/00111; G01S 5/00; G01S 5/02
See application file for complete search history.

(56) References Cited

U.S. PATENT DOCUMENTS

| 5,656,801 A | 8/1997 | Goren et al. | |
| 2005/0092831 A1* | 5/2005 | Sandoval | G07B 15/04 235/382 |
| 2006/0028552 A1* | 2/2006 | Aggarwal | G01S 3/7864 348/169 |
| 2013/0181867 A1 | 7/2013 | Sturdivant et al. | |
| 2014/0008433 A1 | 1/2014 | Hammad et al. | |
| 2014/0015978 A1* | 1/2014 | Smith | G07B 15/02 348/156 |
| 2014/0139678 A1* | 5/2014 | Moriarty | G08B 13/19671 348/152 |

FOREIGN PATENT DOCUMENTS

WO 9923613 A1 5/1999

OTHER PUBLICATIONS

International Search Report and Written Opinion of PCT/US2015/044587 mailed on Oct. 19, 2015, 117 pages.

* cited by examiner

*Primary Examiner* — Andrew Bee
(74) *Attorney, Agent, or Firm* — Kilpatrick Townsend & Stockton LLP (57) ABSTRACT

Systems and techniques are presented for identifying fare evasion at an access control to a paid area. Received signal strength (RSS) is determined for wireless signals communicated between two or more wireless transceivers and a fare media. A position of the fare media is determined based on the RSS and the position is added to a collection of positions. A position of an object is detected and the position of the object is compared with each position in the collection of positions. A determination is made that the position of the object is not proximate to any position in the collection of positions and an indicator light is generated on the floor proximate to the position of the object.

20 Claims, 5 Drawing Sheets

DETECTING AND IDENTIFYING FARE EVASION AT AN ACCESS CONTROL POINT

CROSS-REFERENCES TO RELATED APPLICATIONS

This application claims the benefit of U.S. Provisional Patent Application No. 62/036,012, filed Aug. 11, 2014, entitled "CUBIC TILES," the entire disclosure of which is hereby incorporated by reference for all purposes.

BACKGROUND

1. The Field of the Invention

The present invention generally relates to fare collection. More specifically, the present invention relates to detecting and identifying fare evasion.

2. The Relevant Technology

A turnstile is a commonly found example of a fare gate that can be placed at entry or exit gatelines to process pedestrians through the gate. The turnstile ensures that only one pedestrian can pass through at a time. A payment device can be used in conjunction with a turnstile to automate the fee collection and access granting processes. For example, a payment device that accepts coins, tokens, tickets, or cards can be placed next to the turnstile and can operate the turnstile to grant passage only if a valid payment has been received. Turnstiles also typically include small displays to indicate feedback information, such as a success/failure message or remaining credit.

Turnstiles with payment devices and displays can be used in a wide variety of settings to restrict access to paying customers. While turnstiles are most commonly found in mass transit systems, they can also be utilized at stadiums and sporting events, amusement parks and attractions, or any other setting where payment is collected in exchange for access to a restricted area.

BRIEF SUMMARY

In one embodiment, a system for identifying fare evasion at an access control to a paid area is presented. The system includes a first wireless transceiver, a second wireless transceiver, a light source, a tracking system and a computer server system. The first wireless transceiver and the second wireless transceiver are configured to communicate wirelessly with a fare media. The light source is configured to generate light within an area on the floor and the tracking system is configured to detect the position of an object within the area.

The computer server system is coupled to the light source and the tracking system. The computer server system is configured to receive a first received signal strength (RSS) data and a second RSS data. The first RSS data indicates a first signal strength that a first wireless signal communicated between the first wireless transceiver and the fare media was received at. The second RSS data indicates a second signal strength that a second wireless signal communicated between the second wireless transceiver and the fare media was received at. The computer server system is further configured to determine a position of the fare media based on the first RSS data and the second RSS data and add the position of the fare media to a collection of positions. The position of the object is received from the tracking system and the position of the object is compared with each position in the collection of positions. The computer server system determines that the position of the object is not proximate to any position in the collection of positions based on comparing the position of the object with each position in the collection of positions. A signal is transmitted to the light source that causes an indicator light to be generated on the floor proximate to the position of the object based on determining that the position of the object is not proximate to any position in the collection of positions.

In another embodiment, a method for identifying fare evasion at an access control to a paid area is presented. The method includes communicating a first wireless signal between a first wireless transceiver and a fare media and communicating a second wireless signal between a second wireless transceiver and the fare media. A first RSS is determined for the first wireless signal. The first RSS indicates a signal strength that the first wireless signal was received at. A second RSS is determined for the second wireless signal. The position of the fare media is determined based on the first RSS and the second RSS and the position of the fare media is added to a collection of positions. The position of an object is detected and the position of the object is compared with each position in the collection of positions. It is determined that the position of the object is not proximate to any position in the collection of positions based on comparing the position of the object with each position in the collection of positions. An indicator light is generated on the floor proximate to the position of the object based on determining that the position of the object is not proximate to any position in the collection of positions.

In a further embodiment, a non-transitory computer-readable medium is presented. The non-transitory computer-readable medium has instructions stored therein, which when executed cause a computer to perform a set of operations including receiving a first RSS data and a second RSS data. The first RSS data indicates a first signal strength that a first wireless signal communicated between a first wireless transceiver and a fare media was received at. The second RSS data indicates a second signal strength that a second wireless signal communicated between a second wireless transceiver and the fare media was received at. Further operations include determining a position of the fare media based on the first RSS data and the second RSS data and adding the position of the fare media to a collection of positions. The position of an object is received from a tracking system and the position of the object is compared with each position in the collection of positions. A determination is made that the position of the object is not proximate to any position in the collection of positions based on comparing the position of the object with each position in the collection of positions. A signal is transmitted to a light source that causes an indicator light to be generated on the floor proximate to the position of the object based on determining that the position of the object is not proximate to any position in the collection of positions.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims. Further, when a particular feature, structure, or characteristic is described in connection with an embodiment, it is submitted that it is within the knowledge of one skilled in the art to implement such feature, structure, or characteristic in connection with other embodiments whether or not explicitly described.

Fare gates such as turnstiles can be placed at ingress and egress gatelines for controlling access to restricted areas and to process pedestrians through the gatelines in an orderly fashion. A fare gate can include a ticket validation device, such as a traditional card reader or a radio frequency (RF) transceiver device that can communicate wirelessly with a smart card or mobile device, or some other payment device to fully automate the payment collection and access granting process. However, fare gates can also create bottlenecks since users are processed through a fare gate one at a time. This can cause delays and unwanted crowding in stations, which can be especially undesirable for patrons that are running late.

Embodiments described herein are directed toward ungated systems for collecting fare and detecting and identifying fare evasion. Wireless transceivers and tracking systems can be used to track users entering a paid area and detect the ones that are not carrying a valid fare media, which can be a mobile device or some other portable device that has wireless capabilities, such as Bluetooth or radio-frequency identification (RFID). A light source can light up an area on the floor around an unpaid user to catch other people's attention, including ticket inspectors. Embodiments can reduce fare evasion without the need to install fare gates or validation devices in stations, allowing open floor plans. Furthermore, the number of ticket inspectors that are needed to monitor a gate can be reduced. Although examples and embodiments provided herein are described in the context of public transit systems, it is understood that embodiments are not so limited. Rather, the concepts described herein may be implemented in any environment where access control is used, such as sports stadiums, music halls, movie theatres and amusement parks.

Figure 1A:
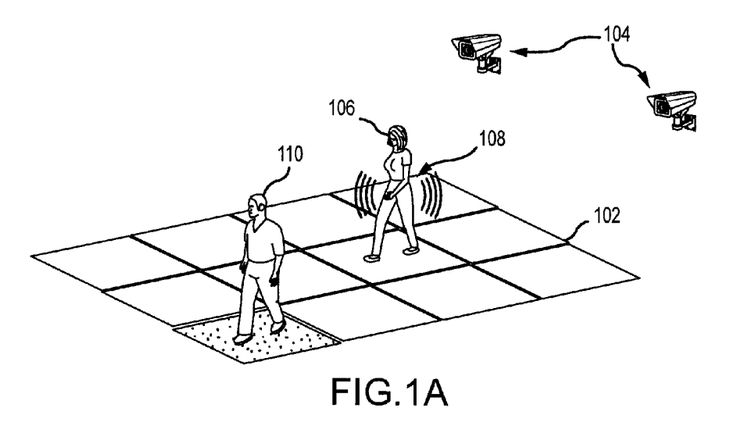
FIG. 1A illustrates an overview of one embodiment of a system for detecting and identifying fare evasion at an access control point.

FIG. 1A illustrates an overview of one embodiment of a system for detecting and identifying fare evasion at an access control point. The system includes tiles 102 covering an access control and fare evasion detection area and cameras 104 aimed at the area. Each tile 102 can have a built-in wireless transceiver, such as a Bluetooth transceiver and/or a RFID transceiver, and a light source. In this figure, first user 106 is carrying a valid fare media 108, such as a Bluetooth enabled smart phone or RFID card, and second user 110 does not have a fare media. When a user enters the area, cameras 104 start tracking the user's position. Meanwhile, the wireless transceivers in each tile 102 will receive signals from the fare media 108. A local server will analyze the received signal strength (RSS) of the signals received by different tiles 102 and calculate the rough position of the fare media 108. Combining that with information from the cameras 104, the server can detect that the second user 110 is an unpaid patron in the area. It will then signal the tile 102 underneath the second user 110 to light up the entire surface of the tile 102.

Figure 1B:
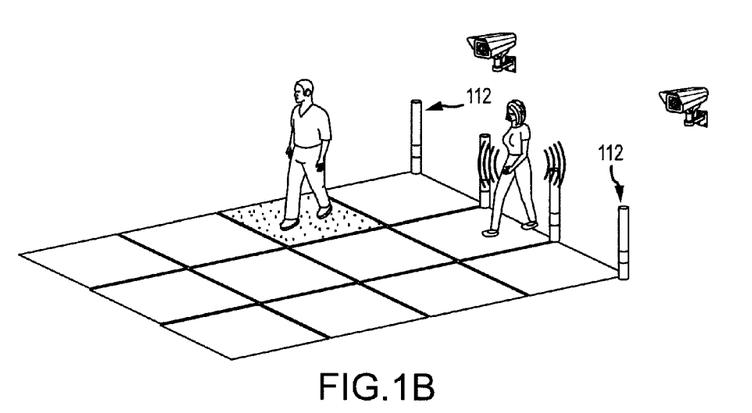
FIG. 1B illustrates an overview of another embodiment of a system for detecting and identifying fare evasion at an access control point.

FIG. 1B illustrates an overview of another embodiment of a system for detecting and identifying fare evasion at an access control point. This embodiment is similar to the embodiment illustrated in FIG. 1A, except that the wireless transceivers 112 are placed within poles around the detection area, rather than within each tile. This reduces the cost of implementing the system since fewer transceivers are needed. Other variations can be made to the system to achieve different advantages. For example, to conserve battery power, the fare media can start broadcasting the wireless signal only when it enters a transit station or nears the detection area. This can be triggered by a beacon, such as a Bluetooth low energy (BLE) beacon, or started manually by the user. Furthermore, to improve accuracy in tracking the users, the floor or each tile can include pressure sensors. The cameras can also be used to automatically take pictures of a potential fare evader that does not have a valid fare media, and the pictures can be transmitted to a ticket inspector's mobile device.

Figure 2:
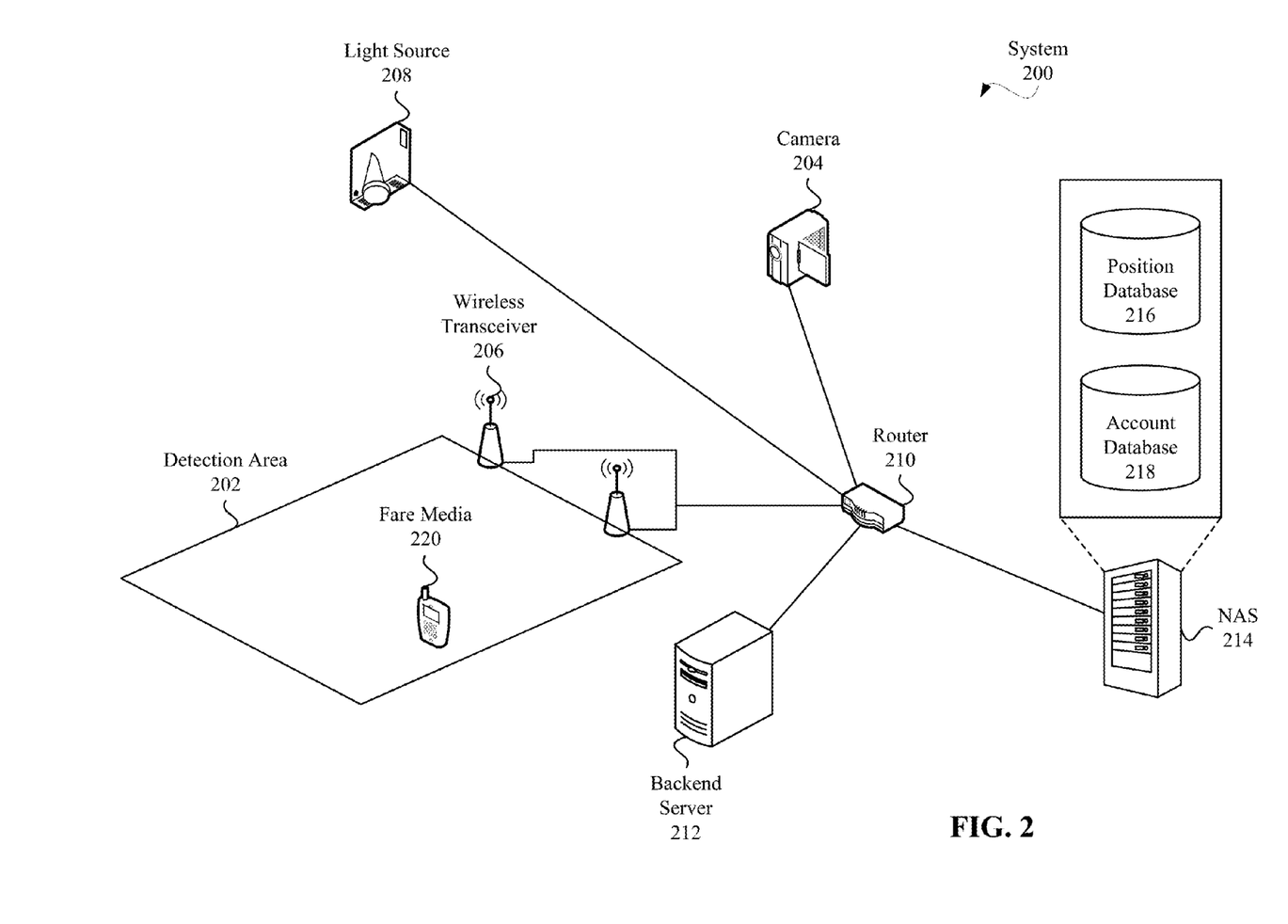
FIG. 2 is an illustration of an example embodiment of a system for detecting and identifying fare evasion at an access control point.

FIG. 2 is an illustration of an example embodiment of a system 200 for detecting and identifying fare evasion at an access control point. In this embodiment, detection area 202 is monitored by an overhead camera 204, which can be a normal camera or a depth camera that uses a combination of image sensors and depth sensors, such as an infrared emitter and sensor, to detect the position of objects within area 202. Although only one camera 204 is illustrated in this figure, it is understood that system 200 can include any number of cameras 204. System 200 also includes two or more wireless transceivers 206, only one of which is labeled for the sake of clarity. Furthermore, in this embodiment, instead of using tiles that light up, a light source 208 is mounted on the ceiling for identifying potential fare evaders.

Camera 204, wireless transceivers 206 and light source 208 are coupled to router 210, which is further coupled to backend server 212. Camera 204 can transmit video or image data to backend server 212 for processing to determine the position of objects within detection area 202. In other embodiments, camera 204 can be a part of a complete tracking system that also performs the processing to determine the position of detected objects, and only the position data is transmitted to backend server 212 for further processing. Furthermore, different position sensing technologies can be implemented in addition to or instead of using camera 204. For example, detection area 202 can include a pressure sensitive walkway that can detect the position of users on the walkway, and crossbeams of infrared or other forms of light that go across the walkway can also be used to determine position of users within the area 202.

In this embodiment, wireless transceivers 206 receive wireless signals from fare media 220. While fare media 220 is illustrated as a mobile device in this figure, it is understood that fare media 220 can be any portable device with wireless communication capabilities, such as Bluetooth, RFID, Wi-Fi, or ultrasound. The wireless signals can include an account identifier or a one-time use soft token that is generated for the account to protect privacy and personal information. In some embodiments, the wireless signal can also be encrypted, for example, using private and/or public keys. The one-time use soft token or the encryption can be based on a counter that increments each time access is granted, a time of day, and/or a day of year. The token or the encryption keys can be generated by backend server 212 and transmitted to an application executed on fare media 220 via, for example, the internet and a cellular data connection or Wi-Fi connection. After wireless transceivers 206 receives the wireless signals from fare media 220, wireless transceivers 206 transmit RSS data indicating the signal strength of the received wireless signals and the account information that is included in the wireless signals to backend server 212 for processing.

In other embodiments, instead of transmitting wireless signals from the fare media 220 to the wireless transceivers 206, the wireless transceivers 206 can transmit the wireless signals for fare media 220 to receive. Fare media 220 can then forward data to backend server 212 for processing through a cellular data connection or a Wi-Fi connection and the internet or a private network. For example, a native mobile application can be executed on fare media 220, if fare media 220 is a mobile device such as a smart phone. The application can store an account identifier and when wireless signals generated by wireless transceivers 206 are received, the application can determine the RSS of the received signals and transmit the account identifier and the RSS data to backend server 212.

Backend server 212 can also transmit signals to light source 208 when a potential fare evader is detected. Light source 208 can be a projector or a spotlight with servo motors. While only one light source 208 is illustrated in this figure, system 200 can include any number of light sources 208, depending on the size of the detection area 202. Using a ceiling mounted light source 208 can reduce hardware costs over using tiles that light up since a ceiling mounted light can cover a larger area than a tile. In some embodiments, infrared light can be used instead of visible light, regardless of whether the light source 208 is ceiling mounted or included in tiles, and ticket inspectors can use infrared glasses to see the light. Infrared light can be a better choice in some systems, for example, if paper tickets and wireless fare media are both accepted since paper ticket users may find it annoying if they are lit up every time they walk in the detection area 202.

Router 210 is also coupled with network attached storage (NAS) 214, which can include one or more databases. NAS 214 stores data for system 200 that is used for identifying fare evasion and performing other functions and features described herein. NAS 214 can be any type of storage device that is accessible over a network, including a storage area network (SAN). In other embodiments, the databases can be stored in backend server 212 rather than on a separate physical machine dedicated to data storage.

In this embodiment, NAS 214 stores a position database 216 and an account database 218. Position database 216 can be used to store data that is used to calculate the position of fare media 220. For example, the position of each wireless transceiver 206 or RSS readings at different positions within detection area 202 can be stored in position database 216. Account database 218 can be used to store accounts that are used for fare payment. For example, user information, purchase history, fare media identifiers, one-time use tokens, and other information associated with accounts can be stored in account database 218. It should be understood that position database 216 and account database 218 are only example databases that can be stored in NAS 214. In other embodiments, different or additional databases can also be stored, such as a video or images database for storing videos or images of potential fare evaders.

Figure 3:
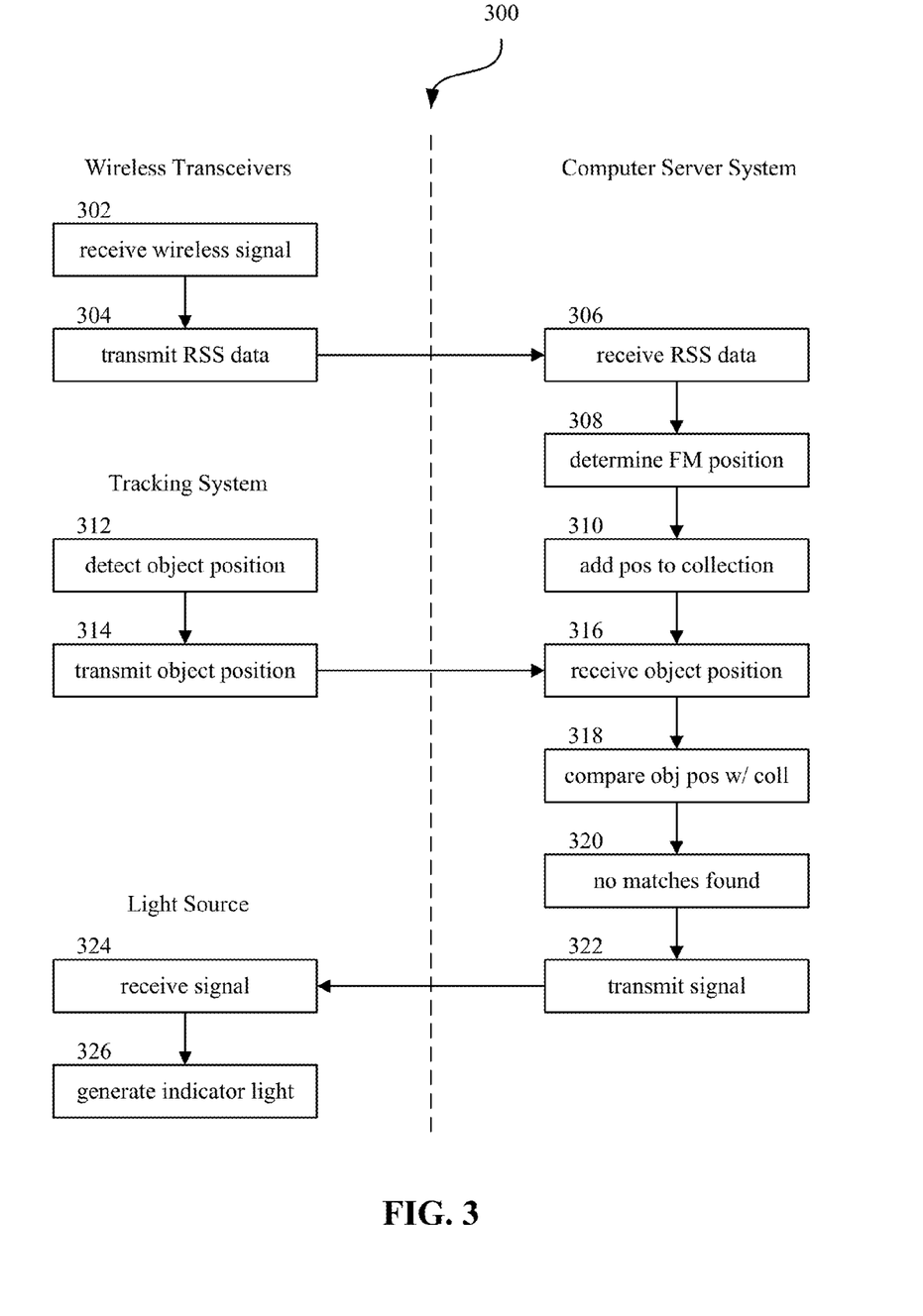
FIG. 3 is an interaction flowchart of one embodiment of a process for detecting and identifying fare evasion at an access control point.

FIG. 3 is an interaction flowchart of one embodiment of a process 300 for detecting and identifying fare evasion at an access control point. This figure illustrates the interactions between wireless transceivers, a tracking system, a light source, and a computer server system. In this embodiment, process 300 starts at block 302, wherein the wireless transceivers receive a wireless signal generated by a fare media. Each wireless transceiver determines the RSS for the received signal and, at block 304, each wireless transceiver transmits RSS data to the computer server system. The wireless signal received by each wireless transceiver can be a single signal generated by the fare media. However, each wireless transceiver will receive the signal at a different RSS since the wireless transceivers are at different distances from the fare media. In other embodiments where the wireless transceivers generate the wireless signals for the fare media to receive, blocks 302 and 304 can be performed by an application executed by the fare media.

At block 306, the computer server system receives the RSS data from each of the wireless transceivers. Based on the RSS data, the position of the fare media is determined at block 308. This can be done, for example, using the known positions of the wireless transceivers and performing techniques such as triangulation or trilateration on the RSS data to determine the fare media position. At block 310, the position of the fare media is added to a collection of positions. In other embodiments, additional blocks can be performed before adding the position of the fare media to the collection to ensure that a valid ticket has been purchased or there are sufficient resources for purchasing a ticket in the account associated with the fare media. More details for adding a fare media position to the collection will be described below with reference to FIG. 4.

At block 312, the tracking system detects the position of an object within the detection area. At block 314, the object's position is transmitted to the computer server system and, at block 316, the computer server system receives the position of the object. At block 318, the computer server system compares the object's position with each position in the collection. For example, if tiles are used, the computer server system can compare the object's position with the predefined area of a tile located at a position in the collection to determine if the object's position is within the area of the tile. If an overhead light source is used, the computer server system can use a radius threshold (e.g., five feet) to determine if the object's position is within the threshold distance to one of the positions in the collection. At block 320, the computer server system determines that the object's position does not match or is not proximate to any of the positions in the collection. Based on this determination, the computer server system transmits a signal to the light source at block 322. The light source receives the signal at block 324 and the signal causes the light source to generate an indicator light around the object's position at block 326. For example, a tile located at the object's position can light up or an overhead light can light up an area on the floor around the object's position.

Figure 4:
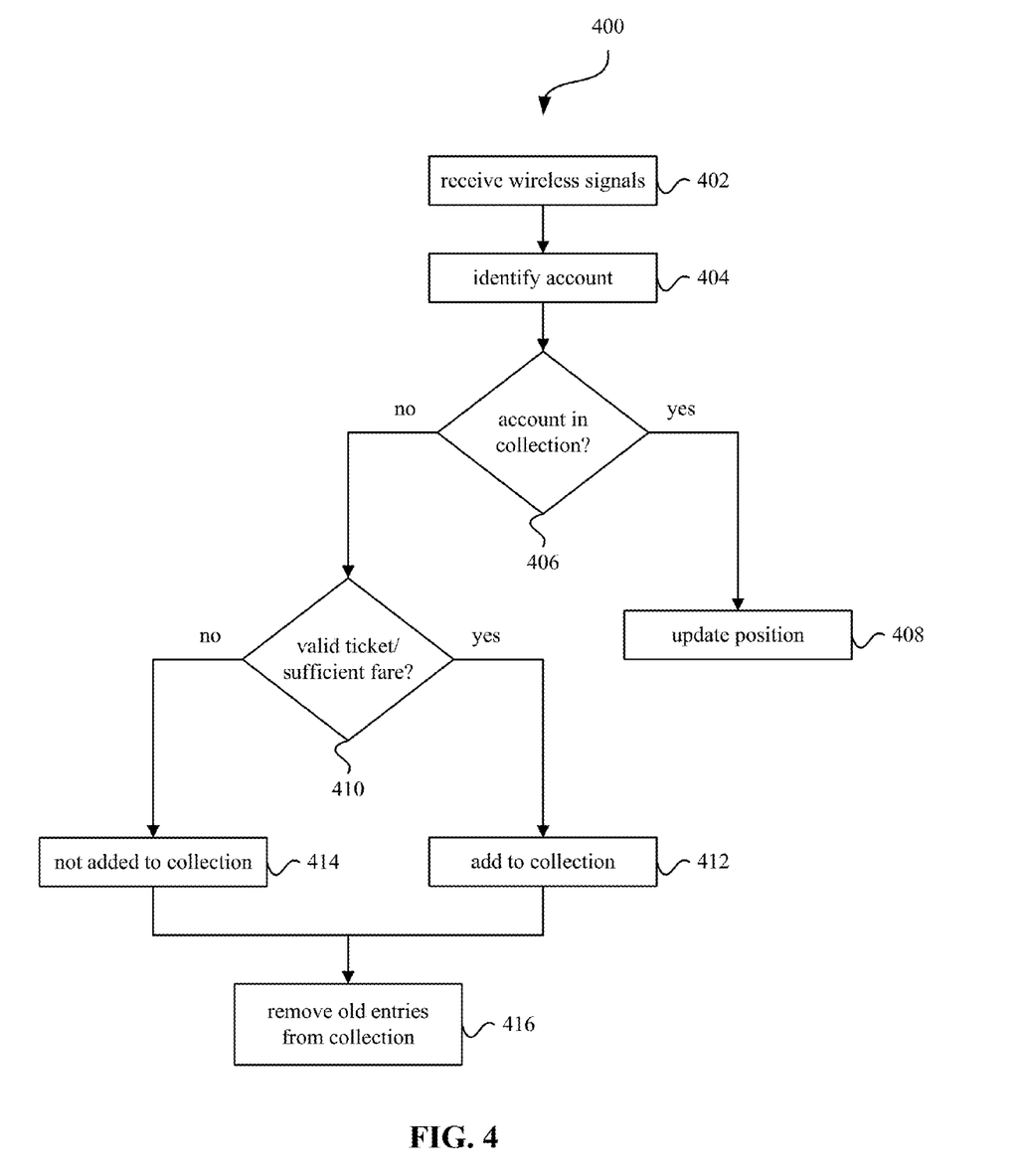
FIG. 4 is a flowchart of an embodiment of a process for maintaining a collection of positions during the detection and identification of fare evasion at an access control point.

FIG. 4 is a flowchart of an embodiment of a process 400 for maintaining a collection of positions during the detection and identification of fare evasion at an access control point. For example, process 400 can be used to maintain a collection of positions for fare media that have purchased a valid ticket and are currently in the detection area. Process 400 can be performed periodically (e.g., every 1-5 seconds) to refresh the collection of positions by updating positions, removing positions of fare media that are no longer in the area, and adding positions of new fare media that have entered the area.

Process 400 begins at block 402, wherein wireless signals are received. Based on the received wireless signals, an account is identified at block 404. For example, if a wireless signal includes a one-time use token, the account that is associated with the token can be selected at block 404. At block 406, a determination is made of whether the account, or more specifically, the position of the fare media associated with the account, is already in the collection. If the account is in the collection, the position of the associated fare media is updated at block 408. The position can be updated by determining the current position of the fare media using the RSS of the wireless signals received in block 402 and replacing an old position with the current position.

If the account is not in the collection, another determination is made at block 410 of whether a valid ticket has been purchased on the account, or whether there are sufficient resources (e.g., credits or funds) for fare in the account. If there is a valid ticket or sufficient resources, the ticket can be marked as used or the fare amount can be deducted from the account and the position of the fare media is added to the collection at block 412. If the account does not have a valid ticket or sufficient resources, process 400 continues to block 414 and the position of the fare media is not added to the collection. Regardless of whether block 412 is performed or block 414 is performed, process 400 continues to block 416 to remove old entries from the collection. For example, if a wireless signal is not received from a fare media during this iteration of process 400 or the wireless signal has not been received for a preset number of iterations (e.g., 2-5), then the position for that fare media is removed from the collection. Thus, for an iteration of process 400, blocks 404 through 414 can be performed for each fare media in the area that is transmitting or receiving wireless signals.

Figure 5:
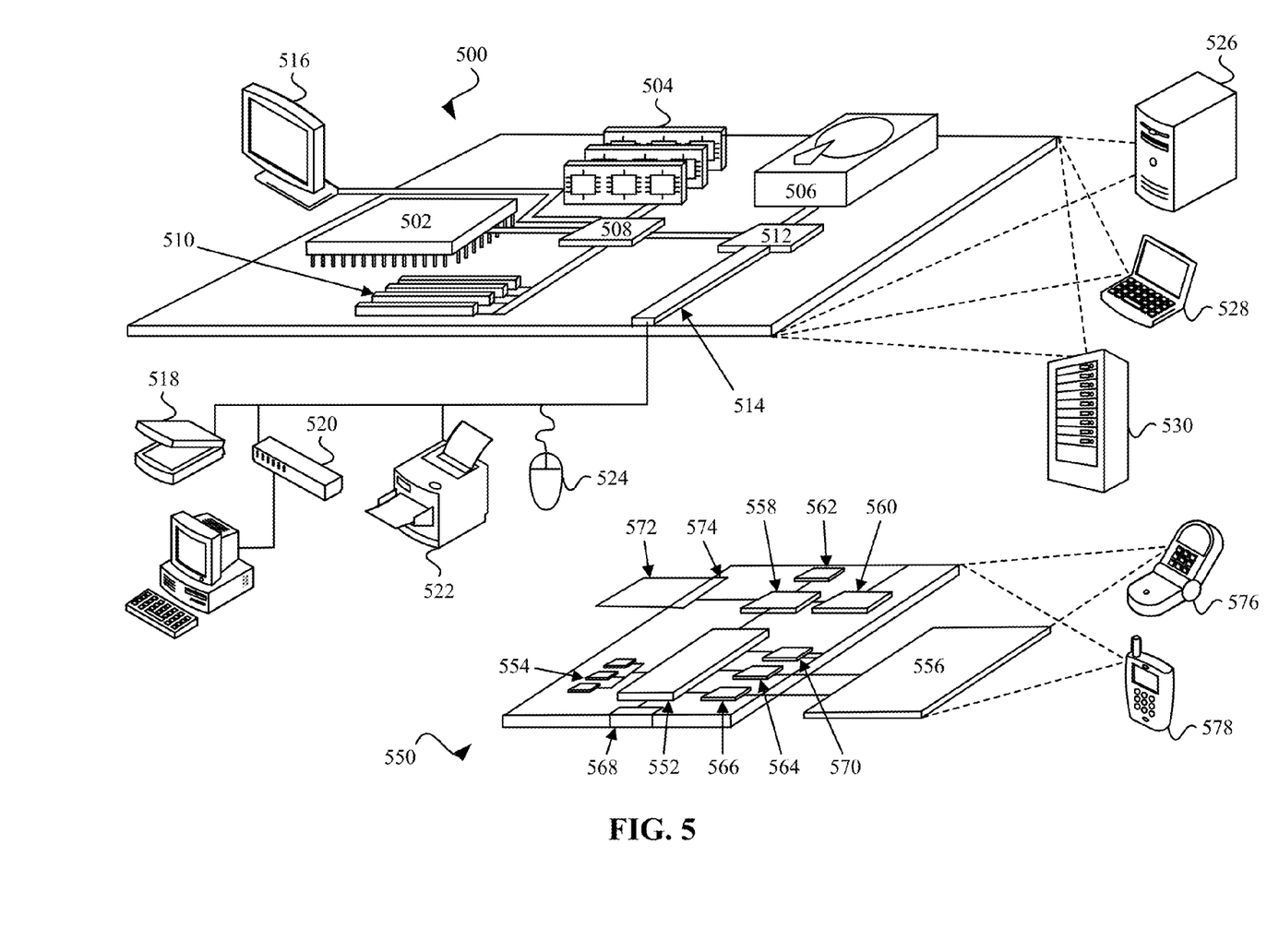
FIG. 5 is an illustration of embodiments of a special-purpose computer system and a computing device that can be used to implement a system for detecting and identifying fare evasion at an access control point.

FIG. 5 is an illustration of embodiments of a special-purpose computer system 500 and a computing device 550 that can be used to implement a system for detecting and identifying fare evasion at an access control point. Special-purpose computer system 500 represents various forms of digital computers, such as laptops, desktops, workstations, personal digital assistants, servers, blade servers, mainframes, and other appropriate computers. Computing device 550 represents various forms of mobile devices, such as personal digital assistants, cellular telephones, smart phones, tablets, laptops and other similar computing devices.

Computer system 500 includes a processor 502, random access memory (RAM) 504, a storage device 506, a high speed controller 508 connecting to RAM 504 and high speed expansion ports 510, and a low speed controller 512 connecting to storage device 506 and low speed expansion port 514. The components 502, 504, 506, 508, 510, 512, and 514 are interconnected using various busses, and may be mounted on a common motherboard or in other manners as appropriate. Computer system 500 can further include a number of peripheral devices, such as display 516 coupled to high speed controller 508. Additional peripheral devices can be coupled to low speed expansion port 514 and can include an optical scanner 518, a network interface 520 for networking with other computers, a printer 522, and input device 524 which can be, for example, a mouse, keyboard, track ball, or touch screen.

Processor 502 processes instructions for execution, including instructions stored in RAM 504 or on storage device 506. In other implementations, multiple processors and/or multiple busses may be used, as appropriate, along with multiple memories and types of memory. RAM 504 and storage device 506 are examples of non-transitory computer-readable media configured to store data such as a computer program product containing instructions that, when executed, cause processor 502 to perform methods and processes according to the embodiments described herein. RAM 504 and storage device 506 can be implemented as a floppy disk device, a hard disk device, an optical disk device, a tape device, a flash memory or other similar solid-state memory device, or an array of devices, including devices in a storage area network or other configurations.

High speed controller 508 manages bandwidth-intensive operations for computer system 500, while low speed controller 512 manages lower bandwidth-intensive operations. Such allocation of duties is exemplary only. In one embodiment, high speed controller 508 is coupled to memory 504, display 516 (e.g., through a graphics processor or accelerator), and to high speed expansion ports 510, which can accept various expansion cards (not shown). In the embodiment, low speed controller 512 is coupled to storage device 506 and low speed expansion port 514. Low speed expansion port 514 can include various communication ports or network interfaces, such as universal serial bus (USB), Bluetooth, Ethernet, and wireless Ethernet.

Computer system 500 can be implemented in a number of different forms. For example, it can be implemented as a standard server 526, or multiple servers in a cluster. It can also be implemented as a personal computer 528 or as part of a rack server system 530. Alternatively, components from computer system 500 can be combined with other components in a mobile device (not shown), such as device 550. Each of such devices can contain one or more of computer system 500 or computing device 550, and an entire system can be made up of multiple computer systems 500 and computing devices 550 communicating with each other.

Computing device 550 includes a processor 552, memory 554, an input/output device such as a display 556, a communication interface 558, and a transceiver 560, among other components. The components 552, 554, 556, 558, and 560 are interconnected using various busses, and several of the components may be mounted on a common motherboard or in other manners as appropriate. Computing device 550 can also include one or more sensors, such as GPS or A-GPS receiver module 562, cameras (not shown), and inertial sensors including accelerometers (not shown), gyroscopes (not shown), and/or magnetometers (not shown) configured to detect or sense motion or position of computing device 550.

Processor 552 can communicate with a user through control interface 564 and display interface 566 coupled to display 556. Display 556 can be, for example, a thin-film transistor (TFT) liquid-crystal display (LCD), an organic light-emitting diode (OLED) display, or other appropriate display technology. Display interface 566 can comprise appropriate circuitry for driving display 556 to present graphical and other information to the user. Control interface 564 can receive commands from the user and convert the commands for submission to processor 552. In addition, an external interface 568 can be in communication with processor 552 to provide near area communication with other devices. External interface 568 can be, for example, a wired communication interface, such as a dock or USB, or a wireless communication interface, such as Bluetooth or near field communication (NFC).

Device 550 can also communicate audibly with the user through audio codec 570, which can receive spoken information and convert it to digital data that can be processed by processor 552. Audio codec 570 can likewise generate audible sound for the user, such as through a speaker. Such sound can include sound from voice telephone calls, recorded sound (e.g., voice messages, music files, etc.), and sound generated by applications operating on device 550.

Expansion memory 572 can be connected to device 550 through expansion interface 574. Expansion memory 572 can provide extra storage space for device 550, which can be used to store applications or other information for device 550. Specifically, expansion memory 572 can include instructions to carry out or supplement the processes described herein. Expansion memory 572 can also be used to store secure information.

Computing device 550 can be implemented in a number of different forms. For example, it can be implemented as a cellular telephone 576, smart phone 578, personal digital assistant, tablet, laptop, or other similar mobile device.

It is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for identifying fare evasion at an access control to a paid area, the system comprising:
a first wireless transceiver configured to communicate wirelessly with a fare media;
a second wireless transceiver configured to communicate wirelessly with the fare media;
a light source configured to generate light within an area on a floor;
a tracking system configured to detect a position of an object within the area on the floor; and
a computer server system coupled to the light source and the tracking system, the computer server system being configured to:
receive a first signal strength (RSS) data, the first RSS data indicating a first signal strength with which a first wireless signal communicated between the first wireless transceiver and the fare media was received,
receive a second RSS data, the second RSS data indicating a second signal strength with which a second wireless signal communicated between the second wireless transceiver and the fare media was received,
determine a position of the fare media based on the first RSS data and the second RSS data,
add the position of the fare media to a collection of positions,
receive the position of the object from the tracking system,
compare the position of the object with each position in the collection of positions,
determine that the position of the object is not proximate to any position in the collection of positions based on comparing the position of the object with each position in the collection of positions, and
transmit a signal to the light source that causes an indicator light to be generated on the floor proximate to the position of the object based on determining that the position of the object is not proximate to any position in the collection of positions.

2. The system of claim 1, wherein the tracking system includes an overhead depth camera.

3. The system of claim 1, wherein the tracking system includes a pressure sensitive walkway.

4. The system of claim 1, wherein the indicator light is an infrared light generated by the light source.

5. The system of claim 1, wherein the light source includes a spotlight and a servomotor.

6. The system of claim 1, wherein the light source is positioned within a tile on the floor.

7. The system of claim 6, wherein the first wireless transceiver is positioned within the tile on the floor.

8. The system of claim 1, further comprising:
an application executed by the fare media, the application being configured to transmit the first wireless signal and the second wireless signal as a single wireless signal that is received by both the first wireless transceiver and the second wireless transceiver.

9. The system of claim 8, wherein the application is further configured to receive a beacon signal, and wherein the application transmits the first wireless signal in response to receiving the beacon signal.

10. A method for identifying fare evasion at an access control to a paid area, the method comprising:
communicating a first wireless signal between a first wireless transceiver and a fare media;
communicating a second wireless signal between a second wireless transceiver and the fare media;
determining a first received signal strength (RSS) for the first wireless signal, the first RSS indicating a signal strength with which the first wireless signal was received;
determining a second RSS for the second wireless signal;
determining a position of the fare media based on the first RSS and the second RSS;
adding the position of the fare media to a collection of positions;
detecting a position of an object;
comparing the position of the object with each position in the collection of positions;
determining that the position of the object is not proximate to any position in the collection of positions based on comparing the position of the object with each position in the collection of positions; and
generating an indicator light on a floor proximate to the position of the object based on determining that the position of the object is not proximate to any position in the collection of positions.

11. The method of claim 10, further comprising:
generating a one-time use token for an access grant,
wherein the first wireless signal includes the one-time use token.

12. The method of claim 10, further comprising:
determining that the position of the object is outside of an area on the floor that includes one of the collection of positions.

13. The method of claim 12, wherein the area on the floor is a predefined region.

14. The method of claim 12, wherein the area on the floor is defined based on a radius around the one of the collection of positions.

15. The method of claim 10, wherein the first wireless signal includes an identifier associated with an account.

16. The method of claim 15, further comprising:
determining that the account has sufficient resources for fare,
wherein the position of the fare media is added to the collection based on determining that the account has sufficient resources for fare.

17. A non-transitory computer-readable medium, having instructions stored therein, which when executed cause a computer to perform a set of operations comprising:
receiving a first received signal strength (RSS) data, the first RSS data indicating a first signal strength with which a first wireless signal communicated between a first wireless transceiver and a fare media was received;
receiving a second RSS data, the second RSS data indicating a second signal strength with which a second wireless signal communicated between a second wireless transceiver and the fare media was received;
determining a position of the fare media based on the first RSS data and the second RSS data;
adding the position of the fare media to a collection of positions;
receiving a position of an object from a tracking system;
comparing the position of the object with each position in the collection of positions;
determining that the position of the object is not proximate to any position in the collection of positions based on comparing the position of the object with each position in the collection of positions; and
transmitting a signal to a light source that causes an indicator light to be generated on a floor proximate to the position of the object based on determining that the position of the object is not proximate to any position in the collection of positions.

18. The non-transitory computer-readable medium of claim 17, wherein the first wireless signal is encrypted using at least one of a public key and a private key.

19. The non-transitory computer-readable medium of claim 18, wherein the first wireless signal is encrypted based on a counter that increments each time access is granted.

20. The non-transitory computer-readable medium of claim 18, wherein the first wireless signal is encrypted based on at least one of time and day.

* * * * *